United States Patent
Becker-Szendy et al.

(10) Patent No.: US 8,959,301 B2
(45) Date of Patent: Feb. 17, 2015

(54) ACCESSING DATA IN A STORAGE SYSTEM (71) Applicant: International Business Machines Corporation, Armonk, NY (US)

(72) Inventors: Ralph A. Becker-Szendy, Los Gatos, CA (US); Veera W. Deenadhayalan, San Jose, CA (US); D. Scott Guthridge, San Jose, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 13/673,183

(22) Filed: Nov. 9, 2012

(65) Prior Publication Data
US 2014/0136802 A1   May 15, 2014

(51) Int. Cl.
*G06F 12/16* (2006.01)
*G06F 11/14* (2006.01)

(52) U.S. Cl.
CPC ............ *G06F 12/16* (2013.01); *G06F 11/1448* (2013.01); *G06F 11/1446* (2013.01); *G06F 11/1456* (2013.01); *G06F 2201/84* (2013.01)
USPC .......................................... 711/162; 711/114

(58) Field of Classification Search
CPC ..... G06F 3/067; G06F 12/0246; G06F 3/061; G06F 3/0688; G06F 11/3485; G06F 17/30082; G06F 17/302; G06F 17/30215; G06F 17/30091; G06F 17/3012; G06F 3/0679; G06F 3/0689; G06F 3/0643; G06F 17/30194; G06F 2212/7208; G06F 3/06; G06F 11/1448; G06F 11/1446; G06F 2201/84; G06F 11/1456; G06F 12/00; G06F 12/16

USPC ................................................. 711/162, 114
See application file for complete search history.

(56) References Cited

U.S. PATENT DOCUMENTS

| | | | |
|---|---|---|---|
| 6,151,624 A | 11/2000 | Teare et al. | |
| 7,424,482 B2 | 9/2008 | Kedem et al. | |
| 7,970,965 B2 | 6/2011 | Kedem et al. | |
| 7,979,403 B2 | 7/2011 | Kedem et al. | |
| 8,578,128 B1 * | 11/2013 | Davenport et al. | 711/202 |
| 2005/0235109 A1 * | 10/2005 | Ogihara et al. | 711/114 |
| 2009/0019095 A1 * | 1/2009 | Asahara et al. | 707/203 |
| 2009/0249290 A1 | 10/2009 | Jenkins et al. | |

(Continued)

OTHER PUBLICATIONS

Anonymous, "Content Metadata and Authorization Exchange Between Content Providers and Service Providers." May 17, 2011.

(Continued)

*Primary Examiner* — Hashem Farrokh
(74) *Attorney, Agent, or Firm* — Cantor Colburn LLP; Yusuke Kanehira (57) ABSTRACT Embodiments of the invention relate to accessing data that spans multiple storage devices in a storage system. A first index records identifiers of data blocks and their storage locations, and a second index records storage locations. An update request is processed by writing multiple copies of a received data block identifier and the updated data block to storage locations recorded in the second index. A read request is processed by performing a quorum read of the storage locations recorded in the second index to retrieve the updated data blocks. The processing of the read request also includes performing a quorum read of the first index to determine storage locations that contain data blocks to be read as part of processing the read request. The data blocks to be read exclude the updated data blocks.

18 Claims, 5 Drawing Sheets

(56) References Cited

U.S. PATENT DOCUMENTS

| | | |
|---|---|---|
| 2009/0307249 A1 | 12/2009 | Koifman et al. |
| 2009/0307250 A1 | 12/2009 | Koifman et al. |
| 2010/0017423 A1 | 1/2010 | Koifman et al. |
| 2010/0036863 A1 | 2/2010 | Koifman et al. |
| 2010/0138604 A1* | 6/2010 | Noguchi et al. ............ 711/114 |
| 2010/0174870 A1* | 7/2010 | Banerjee ................. 711/143 |
| 2010/0228925 A1* | 9/2010 | Doerr et al. .............. 711/147 |
| 2010/0250891 A1 | 9/2010 | Shalev et al. |
| 2010/0277353 A1 | 11/2010 | Shalev et al. |
| 2011/0161293 A1* | 6/2011 | Vermeulen et al. ......... 707/626 |
| 2011/0246444 A1 | 10/2011 | Jenkins et al. |
| 2012/0011340 A1* | 1/2012 | Flynn et al. ............... 711/171 |

OTHER PUBLICATIONS

Beglin, TW. et al., "Directory Structure and Data Layout for the Efficient Writing and Reading of Data on 12' Write Once Read Many Optical Disk MEDIA." IBM Technical Disclosure Bulletin: Mar. 1992. pp. 459-466. vol. 34. No. 10B.

Faris, SM et al., "Improved Reading and Writing Scheme for a Vortex File Memory." IBM (TDB 12-82) Feb. 10, 2005. pp. 3380-3383.

* cited by examiner

ACCESSING DATA IN A STORAGE SYSTEM

This invention was made with Government support under HR0011-07-9-2002 awarded by Defense Advanced Research Projects Agency (DARPA). The Government has certain rights in this invention.

BACKGROUND

The present invention relates generally to a storage system, and more specifically to the storage and retrieval of data, such as metadata, in a storage system.

Disk storage is a general category of storage mechanisms in which data is digitally recorded by various electronic, magnetic, optical, or mechanical methods on a surface layer deposited on one or more planar, round and rotating disks (also referred to as "media" or "storage devices"). A disk drive is a device that is used to implement such a storage mechanism with fixed or removable media.

Storage systems that include multiple storage devices typically utilize metadata to describe the mapping between user data and physical data. On large and complex storage systems with hundreds of storage devices and complex data layouts, the metadata is often voluminous (e.g., multiple Gigabytes or "GBs"). In order to access the data on the storage devices, metadata that describes the mapping between user data and physical data has to be stored in a manner that is as least as reliable as the storage of the data.

In contemporary storage systems, the storage of the metadata is optimized for either good write performance or for good read performance. Thus, in order to maximize efficiency (e.g., speed), a tradeoff is made between the efficiency of writing to the storage device and the efficiency of reading from the storage device.

BRIEF SUMMARY

An embodiment is a method of accessing data in a storage system. The method includes writing data blocks to a first set of storage locations that span a plurality of storage devices. The writing includes for each data block: writing multiple copies of the data block to a subset of the first set of storage locations, the subset of the first set of storage locations located on at least two of the storage devices; and recording in a first index an identifier of the data block and identifiers of the subset of the first set of storage locations. Identifiers of storage locations in a second set of storage locations that span the plurality of storage devices are recorded in a second index. An update request that includes an identifier of one of the data blocks to be updated and an updated data block is processed. The processing includes writing multiple copies of the received identifier and the updated data block to a subset of the second set of storage locations. The subset of the second set of storage locations is located on at least two of the storage devices and selected based on the second index. A read request is processed by performing a quorum read of the second set of storage locations to retrieve the updated data blocks and performing a quorum read of the first index to determine storage locations in the first set of storage locations that contain data blocks to be read as part of processing the read request. The data blocks to be read exclude the updated data blocks.

Another embodiment is a computer program product for accessing indexed data in a storage system. The computer program product includes a computer readable storage medium having program code embodied therewith. The program code is executable by a processor to write data that includes a plurality of data items to a first set of storage locations that span a plurality of storage devices. The writing includes for each data block: writing multiple copies of the data block to a subset of the first set of storage locations, the subset of the first set of storage locations located on at least two of the storage devices; and recording in a first index an identifier of the data block and identifiers of the subset of the first set of storage locations. Identifiers of storage locations in a second set of storage locations that span the plurality of storage devices are recorded in a second index. An update request that includes an identifier of one of the data blocks to be updated and an updated data block is processed. The processing includes writing multiple copies of the received identifier and the updated data block to a subset of the second set of storage locations. The subset of the second set of storage locations is located on at least two of the storage devices and selected based on the second index. A read request is processed by performing a quorum read of the second set of storage locations to retrieve the updated data blocks and performing a quorum read of the first index to determine storage locations in the first set of storage locations that contain data blocks to be read as part of processing the read request. The data blocks to be read exclude the updated data blocks.

A further embodiment is a storage system that includes a storage controller. The storage controller includes a memory having computer readable computer instructions and a processor for executing the computer readable computer instructions. The computer readable computer instructions write data blocks to a first set of storage locations that span a plurality of storage devices. The writing includes for each data block: writing multiple copies of the data block to a subset of the first set of storage locations, the subset of the first set of storage locations located on at least two of the storage devices; and recording in a first index an identifier of the data block and identifiers of the subset of the first set of storage locations. Identifiers of storage locations in a second set of storage locations that span the plurality of storage devices are recorded in a second index. An update request that includes an identifier of one of the data blocks to be updated and an updated data block is processed. The processing includes writing multiple copies of the received identifier and the updated data block to a subset of the second set of storage locations. The subset of the second set of storage locations is located on at least two of the storage devices and selected based on the second index. A read request is processed by performing a quorum read of the second set of storage locations to retrieve the updated data blocks and performing a quorum read of the first index to determine storage locations in the first set of storage locations that contain data blocks to be read as part of processing the read request. The data blocks to be read exclude the updated data blocks.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments described herein are directed to the storage and retrieval of data, such as metadata, in a storage system. An embodiment includes a stable index that is configured to store the locations of a majority of the metadata blocks associated with a storage system, as well as a working index for storing the locations of recently updated metadata associated with the storage system. In an embodiment, these two indexes are stored in a well-known location, referred to herein as a "root block." In an embodiment, at a defined point (e.g., during system initialization or during system shutdown), all of the current metadata for the storage system is written using the stable index. When subsequent updates to the metadata are received, they are written using the working index. A limited number of pre-allocated slots are reserved in the working index. When metadata is retrieved, by using the stable index in combination with the working index, only the root block containing the stable index and the metadata blocks in the locations specified by the working index need to be read using relatively expensive quorum read operations. This combination allows good write speed by performing writes in arbitrary locations using the working index, while also providing good read speed by using the stable index for locating most of the metadata blocks.

Traditionally, metadata has been stored using dedicated hardware such as battery backed random access memory (RAM), electrically erasable programmable read only memory (EEPROM), and non-volatile RAM (NVRAM) on storage controllers. These dedicated hardware technologies are often not suitable for multi-GB metadata at least due to lack of space for large metadata, high cost, and the unavailability of dedicated metadata storage hardware on commodity computer systems. An alternate approach is to store the metadata on the disks that also store user data, with multiple copies of the metadata being written to provide a higher degree of reliability. To unambiguously find the metadata, the metadata is written to a well-known location on the storage device. For example, the metadata may be written right at the beginning of a disk, from where it can be read back during a system start-up or system boot.

In embodiments described herein, it is assumed that when reading metadata, the system has no knowledge of the location of the metadata on the storage device(s) and that the system determines the location of the metadata from reading an index or from performing a quorum read on the storage device(s). Such a lack of advanced knowledge of where the metadata is located may occur, for example, when the metadata is variable in size, when the metadata has a structure that is complex or subject to change, and/or when the number of storage locations or storage devices varies.

Whenever metadata changes, the metadata is written back to the storage device. In complex systems that dynamically handle configuration changes and disk failures, metadata changes, or writes, may be frequent. When the system starts up, the metadata needs to be read from disk. Thus, a performance tradeoff is presented. A first approach is to design the metadata storage platform for high performing writes (e.g., write latency, use of system resources) to improve runtime speed, however this generally results in reads with longer latencies. Another approach is to design the metadata platform for high performing reads to improve startup speed, however this generally results in writes with longer latencies. Embodiments described herein include a metadata storage platform that provides a compromise between these two approaches where both read and write performance is good (e.g., where performance is optimized in terms of speed and/or where the number of disk accesses is minimized).

Figure 1:
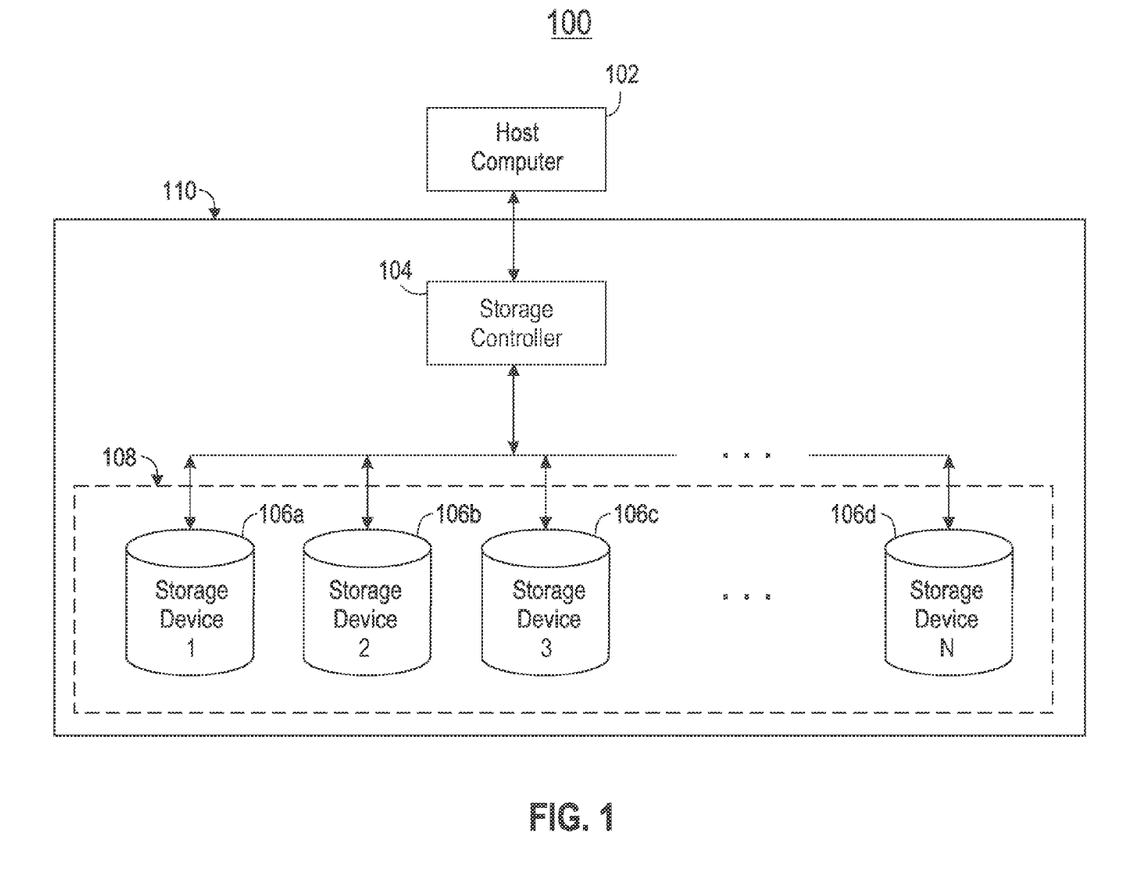
FIG. 1 illustrates a system for providing reading and writing of metadata in accordance with an embodiment.

Turning now to FIG. 1, a block diagram of a system 100 for providing reading and writing of metadata in accordance with an embodiment is generally shown. As shown in FIG. 1, a host computer 102 is in communication with a storage controller 104 in a storage system 110. The storage system 110 stores data in a storage array made up of "N" storage devices 106 (where N is greater than one): storage device one 106a, storage device two 106b, storage device three 106c, through storage device N 106d. In an embodiment, metadata is stored on one or more of the storage devices 106 along with other data. In an embodiment, the storage devices 106 in the storage array 108 are implemented by hard disk drives (HDDs) (also referred to herein as "disks"). As used herein, the term "disk" refers to a HDD which is an example of one type of storage device that may be implemented by exemplary embodiments. As shown in FIG. 1, the storage controller 104 is part of the storage system 110; in another embodiment, the storage controller 104 is part of the host computer 102.

Figure 2:
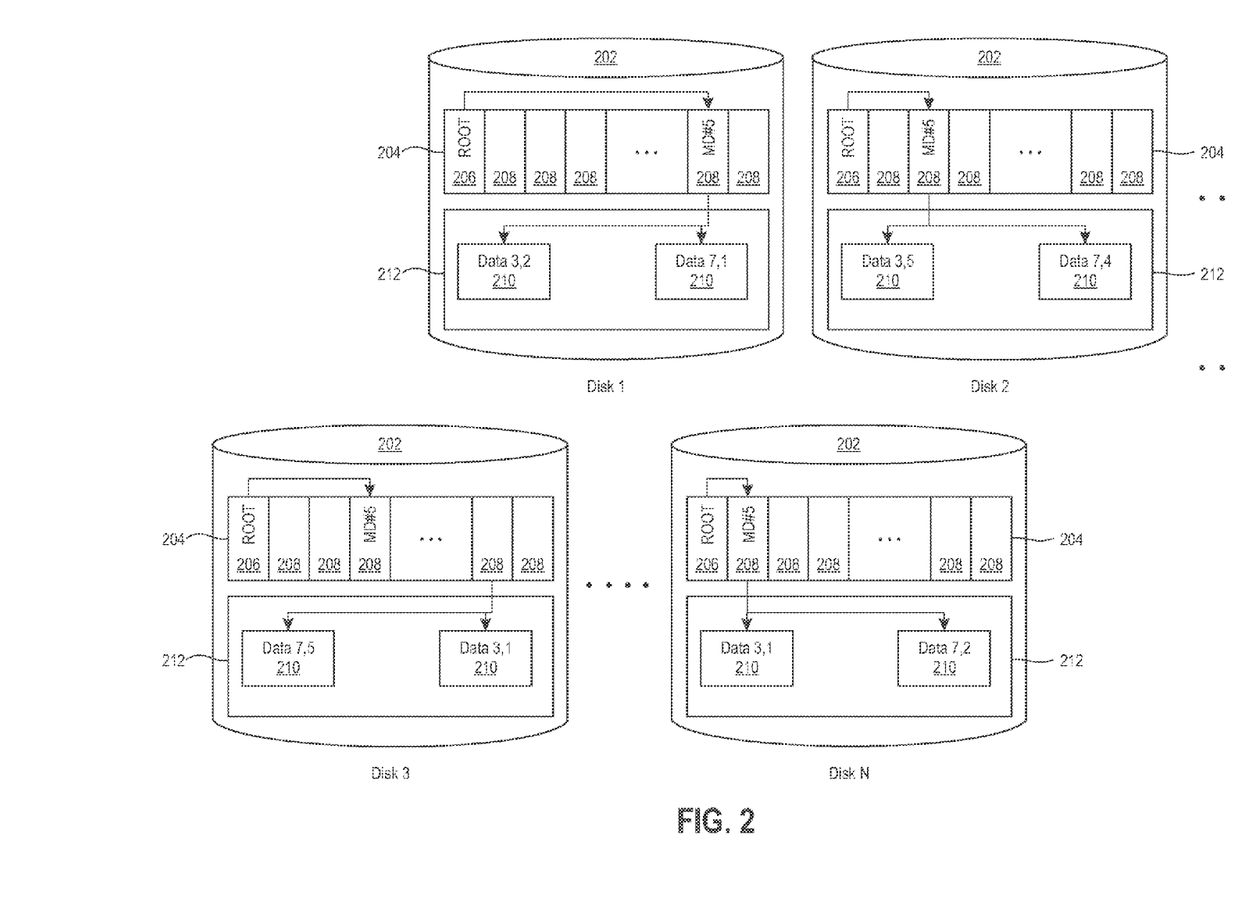
FIG. 2 illustrates a system for storing metadata in accordance with an embodiment.

Turning now to FIG. 2, a system 200 for storing metadata in accordance with an embodiment is generally shown. The system 200 shown in FIG. 2 includes N disks 202. In the embodiment shown in FIG. 2, each disk 202 includes a metadata area 204 for storing metadata blocks 208 as well as a data area 212 for storing data in data locations 210. The metadata area 204 is partitioned into slots, including a slot for storing a root block 206 and multiple slots for the storing metadata blocks 208. The metadata blocks 208 may be fixed size or variable size. The metadata is self-identifying in that it identifies which disks store copies of a particular metadata block. A well-known location (e.g., the top or first slot) may correspond to the root block 206 which contains an index to the metadata blocks 208. The metadata blocks 208 include pointers (or other references) to corresponding data locations 210.

In some embodiments, a copy of the root block 206 does not exist on all the disks 202 in a storage system. An example is a storage system with fifty to one hundred disks and five copies of a root block.

As shown in FIG. 2, the metadata block 208 that is labeled "MD#5" is in use and pointing to data items "3" and "7", which as shown in FIG. 2 are cut into multiple slices, with the notation "3,2" referring to slice "2" of data item "3". In the embodiment shown in FIG. 2, MD#5 is shown in FIG. 2 as existing on all the disks 202 in the storage system 200. In other embodiments, the metadata for a particular data item is located on a subset of the disks 202 in the memory system.

In an embodiment, the root block 206 is used to find the location of a metadata block 208. For example, the root block 206 specifies that MD#5 is on the disk 202 labeled "Disk 1" in the second slot from the right; on "Disk 2" in the third slot from the left; on "Disk 3" in the fourth slot from the left; and on "Disk N" in the second slot from the left.

As shown in FIG. 2, a pointer (or reference) to the data is used in connection with the metadata included in the metadata area 202. For example, the data slices (e.g., DATA 3,2; DATA7,4) are found using the metadata (e.g., MD#5).

In an embodiment, all of the metadata fits into a single fixed size block in a storage system and the storage system has N disks available. For example, N may be equal to six and "n" copies of the metadata are written to achieve a desired reliability. Typically, "n" will be greater than one (n>1) for redundancy to protect against disk read errors, and "n" will be less than N (n<=N) to allow continued operation after a disk failure. The numbers n and N may be well-known or predetermined (e.g., if fixed by the design of the system), or they may be recorded in the metadata itself. The metadata is read using a quorum read to insure that the metadata is valid.

As used herein, the term "quorum read" refers to performing a read on at least a subset of the copies of the metadata. When writing, the storage system places the "n" copies of the metadata block into "n" metadata slots. The storage locations of the metadata slots are well-known, e.g., they are predetermined by a convention established during a design phase or procedure. During a read operation, if "n" or more disks have read errors in a metadata area, or are otherwise unavailable, the storage system knows that it may have failed to read the most current metadata, since those "n" unreadable blocks or slots may have contained the most recent metadata. Therefore, when performing a quorum read at least ((N−n)+1) metadata blocks need to be read successfully (that is, without error) before a determination is made that the metadata is reliable or up to date. In the foregoing example if N=6 and n=5, then 2 (i.e., ((6−5)+1)) metadata blocks need to be read successfully in order to determine that the metadata is reliable. Of course, these values are illustrative and are merely intended to facilitate an example of a quorum read. Other values may be used in some embodiments. In some embodiments, a storage system increases "n" over the minimum required for reliability. This results in increasing the amount of metadata that needs to be written each time the metadata changes and in reducing the amount of metadata that needs to be read. This is because the system can stop reading after ((N−n)+1) good blocks, which can be made very small if "n" is large and close to N. Such a scenario is indicative of a quorum algorithm, with a write quorum of "n" blocks and a read quorum of ((N−n)+1) blocks to guarantee an overlap between write and read quorums.

In an embodiment, each metadata spans two or more blocks, i.e., it requires multiple metadata blocks to be stored. For example, there may be "m" metadata blocks (for simplicity all of equal size) to be stored for each metadata. Furthermore, it may be desirable to store "n" copies of each of the "m" blocks for redundancy or reliability purposes.

On one or more of the N disks an area of M metadata slots is reserved, with M selected such that n*m<=N*M. The N*M slots are referred to as the metadata area, such as metadata area 202 shown in FIG. 2. In some embodiments, the metadata area is sized such that n*(m+1)<=N*M. Such sizing is large enough so that no current metadata has to be overwritten. In some embodiments, M is much larger than one.

In an embodiment, the storage system is configured to record a number of items in order to implement metadata storage. Every metadata block is configured to be self-identifying, so that after reading a block from disk a determination may be made regarding which particular metadata block was read. The metadata blocks may contain a version number (or a similar form of timestamp) so that if while performing a read, older or newer versions of the metadata block are found, a determination may be made regarding which version to keep or retain. A record of which slot locations are in use (e.g., contain current copies of metadata blocks) or free may be stored in memory (not necessarily persistent on disk) accessible by the storage controller.

In an embodiment, one or more strategies are followed to make sure that all of the metadata is read. One strategy is referred to as a quorum read and another strategy is referred to as an index read. Operations using the quorum read and the index read are described in further detail below.

A quorum read is performed in a storage system where metadata blocks are written in any "n" available slots on separate disks without persistently recording where the metadata is stored. In this example, the index does not contain information about what particular metadata is stored at which location, only that some metadata may be stored at that location. This approach leads to optimal writing, but when reading the metadata, at least ((N*M−n)+1) blocks have to be successfully read, because any "n" unread slots could be a place where "n" copies of a new version of a metadata block is stored. Using a quorum read, all "n" copies of each metadata block are read, even though they may be redundant. Using a quorum read, any set of "n" read errors in the metadata area may cause the read to fail.

The strategy of using an index read is performed in a storage system where metadata is written to "n" metadata blocks in "n" slots, and an index (or directory or meta-metadata) is updated to indicate what metadata block that is stored in a particular location in the metadata area. In an embodiment, the index is stored, for example, in a root block, such as root block 206 shown in FIG. 2. In some embodiments, the root block corresponds to, or coincides with, the very first metadata block, which may be restricted to the first N metadata slots on each disk. If the index is too large to fit in a single root block, a tree structure may be recursively interspersed, with the root block containing a meta-metadata index pointing to separate meta-metadata blocks, which then index to the real or actual metadata blocks.

Using an index read, the cost of reading is relatively low if M>1. For example, only the first ((N−n)+1) blocks have to be read to find the root block, and after that only an additional "m" blocks have to be read to find one copy of each of the other metadata blocks (assuming no read errors). For large values of m and therefore M, ((N−n)+1+m) is considerably smaller than ((N*M−n)+1). A cost associated with the approach using the index read is that for each write operation, twice as many blocks have to be written (i.e., the "n" copies of the metadata block themselves and "n" copies of the root block).

A tradeoff between the quorum read and the index read described above is stated as follows. If, a storage system has no prior knowledge of the contents of particular metadata blocks based on reading the index, the system will need to do a quorum read of substantially all of the slots to make sure it has found the most up to date metadata. To avoid the quorum read for all but an index block, the system needs to have knowledge of which set of slots each block is stored in. However, this knowledge of which set of slots each block is stored in may be expensive to update using the index read technique.

Embodiments described herein provide a compromise with respect to the tradeoff described above between a quorum read and an index read.

Figure 3:
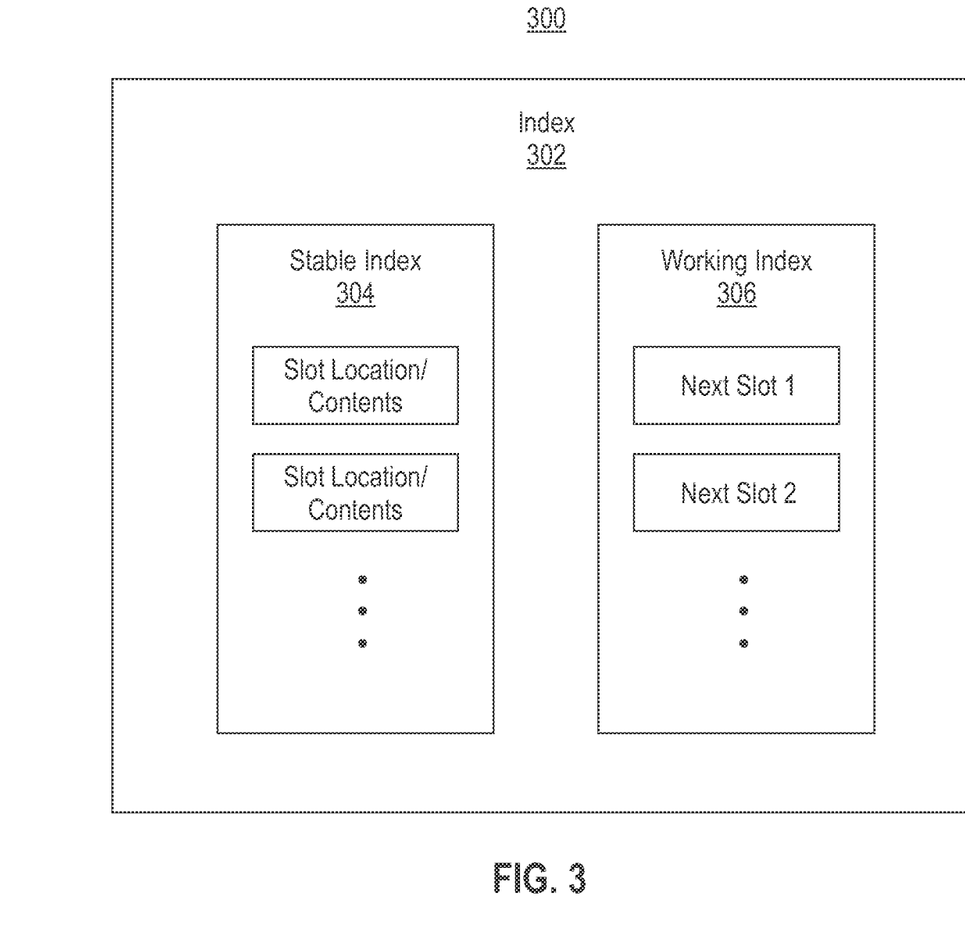
FIG. 3 illustrates an index that includes a stable index and a working index in accordance with an embodiment.

Referring now to FIG. 3, an index 300 that includes a stable index and a working index in accordance with an embodiment is generally shown. In an embodiment, the index 300 is stored in a root block, such as root block 206 shown in FIG. 2. As shown in FIG. 3, the index 302 is separated into two parts: the stable index 304 and the working index 306. The stable index 304 identifies specific metadata blocks as well as the slot location of each specific metadata block (such as metadata block 208 shown in FIG. 2) at the time a root block containing the index 302 was written. For all blocks in the stable index 304, the procedure for reading metadata follows the index read technique described above, providing good read speed.

In an embodiment, the working index 306 is relatively small (e.g., when compared to the stable index 304) and it contains a list of the slots where metadata is to be written next. The working index 306 contains a list of slots that will contain metadata at some point in the future or that currently contain metadata, the working index 306 does not identify the specific metadata blocks that are stored in any of the slots in the list. W slots are reserved for use by the working index 306, with W=w*n. In an embodiment, any time that the root block is written, a small number of free slots (slots not containing current metadata blocks) are allocated and placed in the working index 306, and the working index 306 is written (together with the stable index 304) as part of the root block. If a modified metadata block needs to be written, a set of "n" slots is obtained from the working index 306, and the metadata is written into these obtained slots. In an embodiment, each slot in the set is located on a different storage device. As long as there are slots available in the working index 306, there is no need to update the root block on the write of each metadata block.

In an embodiment, reading of the metadata is performed as follows. The root block containing both the working index 306 and the stable index 304 is read using a quorum read of the first ((N−n)+1) slots. Next, the slots containing metadata that are pointed to by the working index 306 are read (requiring a quorum read of ((W−n)+1) slots). Depending on how many metadata blocks were modified since the last write of the root block, this will yield "r" recently modified metadata blocks, with 0<=r<=w. Once the metadata blocks listed in the working index 306 have been read, the remainder of the metadata is read using the stable index 304, excluding those metadata blocks for which more recent copies were already read using the working index 306. By construction, these blocks have not have been modified since the root block was written. As such, only m−r reads (again assuming no read errors) are required. Thus, the total number of blocks read is equal to ((N−n)+1)+((W−n)+1)+(m−r).

Occasionally, the working index 306 may be exhausted (i.e., no available slots). In such instances, the root block will need to be written. In an embodiment, the writing of the root block is performed by recording, in the stable index 304, the locations of all metadata blocks, including the ones currently stored in slots used in the previous working index 306. It should be noted that such a recording might only update the locations of these blocks in the stable index 304. The recording might not cause a movement of the metadata on disk, since the metadata may remain in the blocks it was written in earlier (in connection with this previous working index 306). The recording will free up W slots that were used for older copies of metadata blocks that were already stored using the previous working index 306. Then, W new slots may be allocated, placed in the working index 306, and then the root block is written. This operation may be done once for every "w" metadata blocks. Thus, the cost of writing metadata blocks is increased only from "n" blocks to $(1+(1/w))*n$ blocks, not to $2n$ blocks as for the naive index implementation above.

Additional embodiments provide further optimization. As mentioned above, the slots in the working index 306 can be read using a quorum read, requiring no more than W−n+1 blocks to be read. In an alternate embodiment, the working index 306 is organized into 'w' n-tuples, and whole n-tuples are used when writing a metadata block. This implies that only one slot of each n-tuple needs to be read, barring read errors. Such a modification reduces the cost of reading the blocks from the working index 306 from (W−n)+1 to "w". This alternative embodiment includes a slight cost if a slot cannot be written to (e.g., due to a write error) because a whole n-tuple from the working index 306 needs to be skipped. This is contrasted to an embodiment where the working index 306 slots form an unstructured set of slots and only one slot needs to be skipped on a write error, but (W−n)+1 blocks need to be read.

Whenever the slots in the working index 306 have been exhausted, the next metadata block write cannot be written using the working index 306, but instead metadata locations from the working index 306 need to be moved to the stable index 304, a new working index 306 needs to be allocated, and a write of the root block performed, as described above. Performing this in-line with the metadata write operation can be avoided by beginning an asynchronous refill of the working index 306 whenever the number of slots available through the working index 306 becomes less than a specified threshold. While this modification doesn't change the average number of writes, it amortizes the cost of extra root block write(s), and evens out the latency of metadata block write(s). The asynchronous refill of the working index 306 may be performed by the storage system when the workload is in an idle or lull period.

Figure 4:
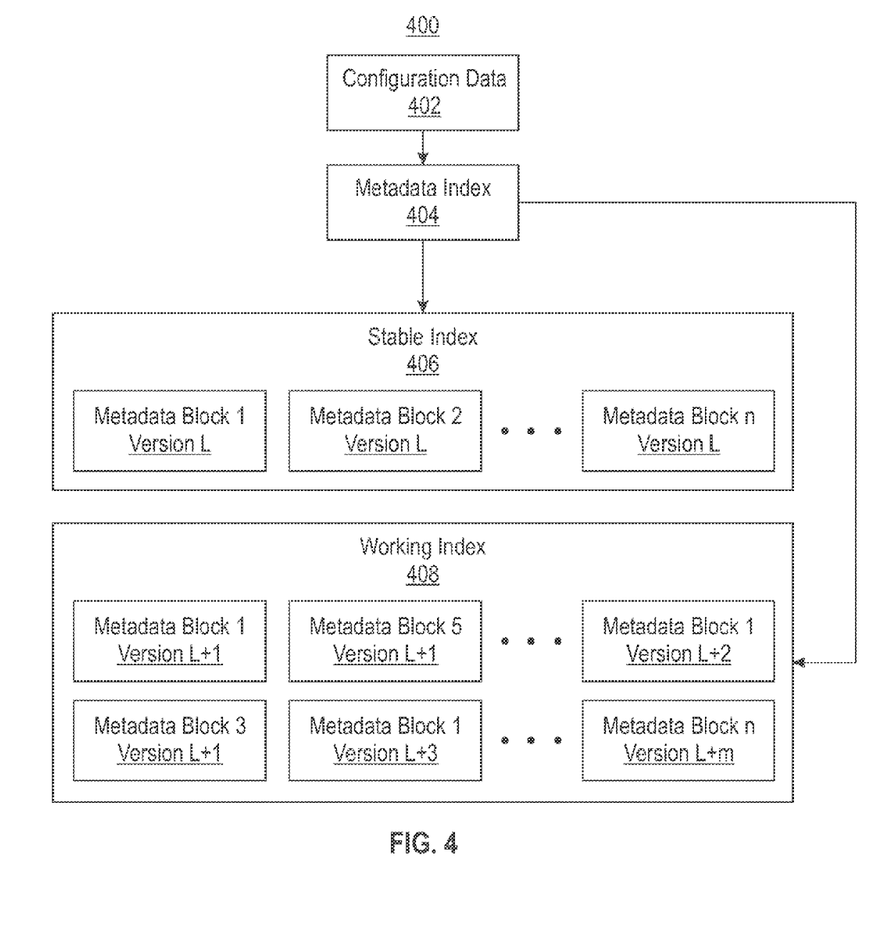
FIG. 4 illustrates a metadata configuration in accordance with an embodiment.

Referring now to FIG. 4, a metadata configuration 400 in accordance with an embodiment is generally shown. The system 400 includes configuration data 402, such as primordial configuration data that corresponds to a known location on a disk, such as the root block described above.

In an embodiment, the configuration data 402 references a metadata index 404, such as index 302 shown in FIG. 3. The metadata index 404 includes a stable index 406 and a working index 408. In an embodiment, the stable index 406 corresponds to the stable index 304 of FIG. 3, and the working index 408 corresponds to the working index 306 of FIG. 3. The stable index 406 stores the locations and references to "n" blocks of metadata associated with a corresponding baseline version or version number L. The working index 408 stores updates or changes the locations where (but not references to) metadata blocks with incremented values of the versions numbers are written, as shown. In some embodiments, the version numbers are stored separately from one or both of the stable index 406 and the working index 408.

Figure 5:
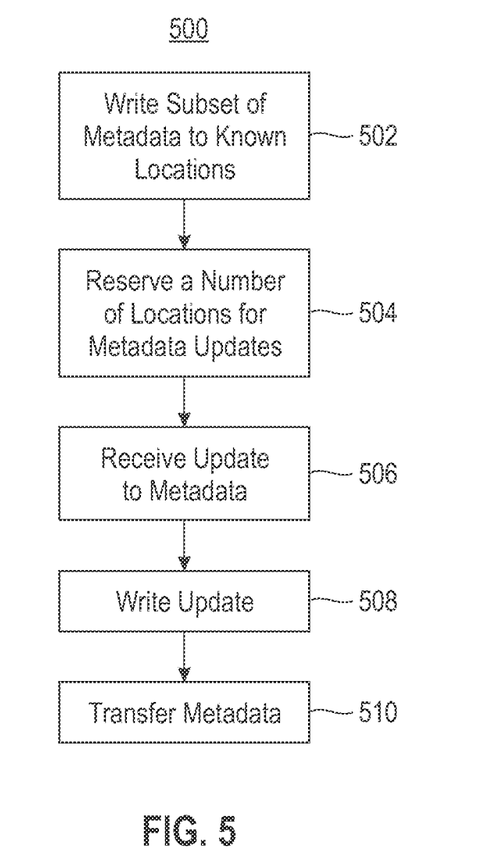
FIG. 5 illustrates a process for providing reading and writing of metadata in accordance with an embodiment.

Turning now to FIG. 5, a process 500 for providing reading and writing of metadata in accordance with an embodiment is generally shown. In an embodiment, the process shown in FIG. 5 is performed by any processor, such as a processor located on storage controller 104 of FIG. 1.

At block 502, a subset (e.g., the metadata at start up time) of the metadata is written to known locations that are recorded in the stable index. In an embodiment, the stable index itself is written as part of the root block. In another embodiment, the root block is separately written on disk, and the placement of the stable index is recorded t in the root block.

At block 504, a number of locations are reserved for metadata updates in the working index. In an embodiment, the number of reserved locations in the working index is small relative to the number of locations recorded in the stable index.

At block 506, an update to the metadata is received. For example, an update to or a new version of a block of metadata written in connection with block 502 is received. Alternatively, the update may pertain to metadata in which no corresponding prior version exists.

At block 508, the update to the metadata in connection with block 506 is written without updating the working index to indicate the contents of the metadata that was written. As part of block 508, the update is written in conjunction with the working index, from which reads are performed using a quorum read technique.

At block 510, a transfer of metadata from working index locations to stable index locations occurs. In an embodiment, the transfer takes place in connection with a background task associated with the execution of a program or instructions on a computing device. The transfer may be based on the existence of metadata currently stored in the working index exceeding a threshold (e.g., two-thirds of the capacity of the working index) and/or based on having reached a lull or idle period in terms of a workload on the storage controller. As a result of the transfer, additional slots are freed in the working index in order to receive and write future updates to the metadata. In an embodiment a portion of the metadata is moved from the working index locations to the stable index locations. In another embodiment, all of the metadata is moved from the working index locations to the stable index locations. The working index and stable index are updated to reflect the movement of the metadata from the working index locations to the stable index locations.

In an embodiment, slots for the working index are allocated when currently used blocks in the working index are promoted to the stable index, thereby releasing previously used blocks. In addition, unused blocks may be allocated for the working index. A complete metadata index may be written, which includes the updated stable index and the unused working index. A root block may be updated to point at the new metadata index.

Aspects of the disclosure may be used to write and read data, such as metadata. The metadata may pertain to any information that may need to be written (e.g., written on disk). Embodiments of the disclosure may be applied in connection with one or more file systems, databases, redundant array of independent disks (RAID) systems, etc.

In some embodiments, error checking may be provided in connection with an index read, in which a location may be recorded in an existing root block.

Technical effects and benefits include a balancing between the performance of a read operation and a write operation. Embodiments of the disclosure provide for a stable index that stores most of the metadata in a manner optimized for efficient read operations. Embodiments of the disclosure provide a working index that is used for recent changes to metadata, in a manner that is optimized for write operations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for accessing data in a storage system, the method comprising:
    writing data blocks to a first set of storage locations, the first set of storage locations spanning a plurality of storage devices and the writing comprising, for each data block:
        writing multiple copies of the data block to a subset of the first set of storage locations, the subset of the first set of storage locations located on at least two of the storage devices; and
        recording, in a first index, an identifier of the data block and identifiers of the subset of the first set of storage locations;
    recording, in a second index, identifiers of storage locations in a second set of storage locations, the second set of storage locations spanning the plurality of storage devices;
    processing an update request that includes an identifier of one of the data blocks to be updated and an updated data block, the processing an update request comprising writing multiple copies of the received identifier and the updated data block to a subset of the second set of storage locations, the subset of the second set of storage locations located on at least two of the storage devices and selected based on the second index; and
    processing a read request, the processing a read request comprising:
        performing a quorum read of the second set of storage locations to retrieve the updated data blocks; and
        performing a quorum read of the first index to determine storage locations in the first set of storage locations that contain data blocks to be read as part of processing the read request, the data blocks to be read excluding the updated data blocks,
    wherein performance of the processing of the update request is preserved by writing the received identifier and the updated data block to the second set of storage locations and the processing of the read request is preserved by utilizing the first index to locate storage locations to be read in the first set of storage locations.

2. The method of claim 1, wherein the data blocks comprise metadata.

3. The method of claim 2, wherein the first set of storage locations and the second set of storage locations are located in a metadata area on the storage devices, and the first index and the second index are located in one or more root blocks in the metadata area.

4. The method of claim 2, wherein the metadata includes a mapping between user data and physical data on the storage devices.

5. The method of claim 2, wherein the read request includes a request to read all of the metadata on the storage devices.

6. The method of claim 1, further comprising:
    moving at least a portion of the updated data blocks to the first set of storage locations; and
    updating the first and second indexes to reflect the moving of at least a portion of the updated data blocks to the first set of storage locations.

7. The method of claim 6, wherein the moving occurs responsive to a determination that a lull or idle period is reached in a workload on the storage system.

8. The method of claim 1, further comprising:
    organizing the second set of storage locations as a number of n-tuples; and
    writing the updated data blocks as whole n-tuples to the second set of storage locations.

9. A computer program product for accessing data in a storage system, the computer program product comprising:
    a non-transitory computer readable storage medium having program code embodied therewith, the program code executable by a processor to:
        write data blocks to a first set of storage locations, the first set of storage locations spanning a plurality of storage devices and the writing comprising, for each data block:

writing multiple copies of the data block to a subset of the first set of storage locations, the subset of the first set of storage locations located on at least two of the storage devices; and recording, in a first index, an identifier of the data block and identifiers of the subset of the first set of storage locations;

record, in a second index, identifiers of storage locations in a second set of storage locations, the second set of storage locations spanning the plurality of storage devices;

process an update request that includes an identifier of one of the data blocks to be updated and an updated data block, the processing an update request comprising writing multiple copies of the received identifier and the updated data block to a subset of the second set of storage locations, the subset of the second set of storage locations located on at least two of the storage devices and selected based on the second index; and process a read request, the processing a read request comprising:

performing a quorum read of the second set of storage locations to retrieve the updated data blocks; and performing a quorum read of the first index to determine storage locations in the first set of storage locations that contain data blocks to be read as part of processing the read request, the data blocks to be read excluding the updated data blocks, wherein performance of the processing of the update request is preserved by writing the received identifier and the updated data block to the second set of storage locations and the processing of the read request is preserved by utilizing the first index to locate storage locations to be read in the first set of storage locations.

10. The computer program product of claim 9, wherein the data blocks comprise metadata.

11. The computer program product of claim 10, wherein the first set of storage locations and the second set of storage locations are located in a metadata area on the storage devices, and the first index and the second index are located in one or more root blocks in the metadata area.

12. The computer program product of claim 10, wherein the metadata includes a mapping between user data and physical data on the storage devices.

13. The computer program product of claim 9, wherein the program code is further executable by the processor to:

move at least a portion of the updated data blocks to the first set of storage locations; and update the first and second indexes to reflect the moving of at least a portion of the updated data blocks to the first set of storage locations.

14. The computer program product of claim 13, wherein the moving occurs responsive to a determination that a lull or idle period is reached in a workload on the storage system.

15. A storage system comprising:

a storage controller comprising a memory having computer readable computer instructions and a processor for executing the computer readable computer instructions, the computer readable computer instructions including:

writing data blocks to a first set of storage locations, the first set of storage locations spanning a plurality of storage devices and the writing comprising, for each data block:

writing multiple copies of the data block to a subset of the first set of storage locations, the subset of the first set of storage locations located on at least two of the storage devices; and recording, in a first index, an identifier of the data block and identifiers of the subset of the first set of storage locations;

recording, in a second index, identifiers of storage locations in a second set of storage locations, the second set of storage locations spanning the plurality of storage devices;

processing an update request that includes an identifier of one of the data blocks to be updated and an updated data block, the processing an update request comprising writing multiple copies of the received identifier and the updated data block to a subset of the second set of storage locations, the subset of the second set of storage locations located on at least two of the storage devices and selected based on the second index; and processing a read request, the processing a read request comprising:

performing a quorum read of the second set of storage locations to retrieve the updated data blocks; and performing a quorum read of the first index to determine storage locations in the first set of storage locations that contain data blocks to be read as part of processing the read request, the data blocks to be read excluding the updated data blocks, wherein performance of the processing of the update request is preserved by writing the received identifier and the updated data block to the second set of storage locations and the processing of the read request is preserved by utilizing the first index to locate storage locations to be read in the first set of storage locations.

16. The system of claim 15, wherein the data blocks comprise metadata.

17. The system of claim 16, wherein the first set of storage locations and the second set of storage locations are located in a metadata area on the storage devices, and the first index and the second index are located in one or more root blocks in the metadata area.

18. The system of claim 15, wherein the computer readable computer instructions further include:

moving at least a portion of the updated data blocks to the first set of storage locations; and updating the first and second indexes to reflect the moving of at least a portion of the updated data blocks to the first set of storage locations.

* * * * *